Dec. 3, 1968 G. A. PETERSEN 3,414,690
AUGER HEAD WITH ODD NUMBER OF ARMS
Filed Dec. 27, 1966 2 Sheets-Sheet 1
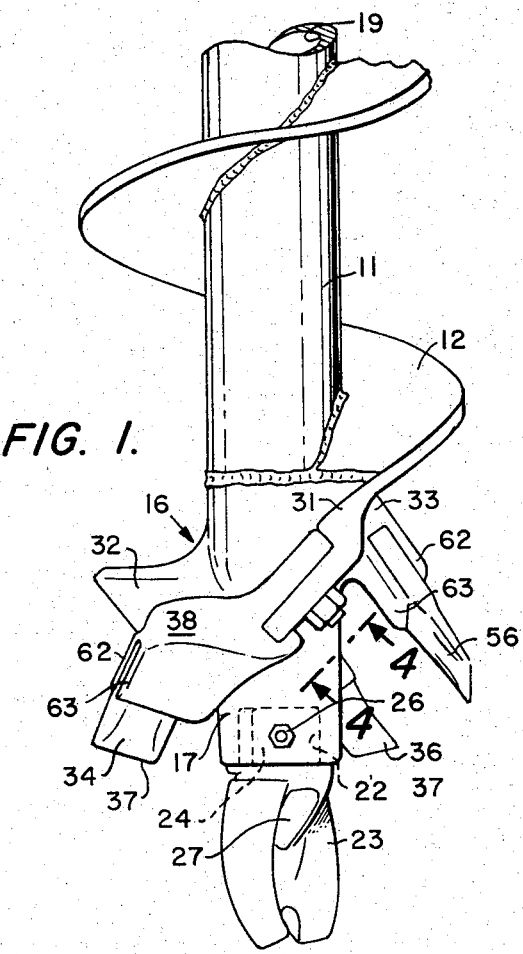
FIG. 1.
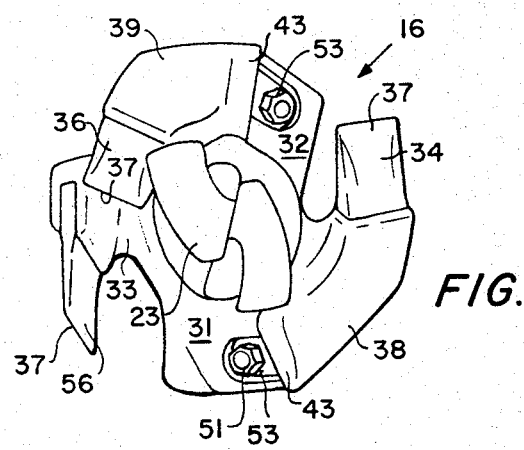
FIG. 2.
INVENTOR.
GERALD A. PETERSEN
BY
PATENT ATTORNEY Dec. 3, 1968    G. A. PETERSEN    3,414,690
AUGER HEAD WITH ODD NUMBER OF ARMS
Filed Dec. 27, 1966    2 Sheets-Sheet 2

INVENTOR.
GERALD A. PETERSEN
BY
PATENT ATTORNEY 3,414,690
AUGER HEAD WITH ODD NUMBER OF ARMS
Gerald A. Petersen, c/o Petersen Engineering Co., Inc., 950 Kifer Road, Sunnyvale, Calif. 94086
Continuation-in-part of application Ser. No. 514,883, Dec. 20, 1965. This application Dec. 27, 1966, Ser. No. 604,670
8 Claims. (Cl. 175—391)

ABSTRACT OF THE DISCLOSURE

An odd number of arms are provided on an earth auger head, each supporting at least one replaceable tooth and at least some arms having detachable tooth holder plates to which the teeth are detachably secured. Several of the teeth are disposed to cut the bottom of the hole and at least one tooth to cut the side. The teeth are arranged so that the torques transmitted by digging action of the various teeth are balanced. Tooth holders are attached to the auger arms in such manner that both side thrust and down thrust on the teeth are resisted by interfitting portions of the respective parts and thus a single bolt or other fastener is sufficient to secure the plate to the arm.

---

This invention relates to a new and improved earth auger head construction.

This application is a continuation-in-part of copending application Ser. No. 514,883 filed Dec. 20, 1965.

The present invention relates to an auger head for an earth-boring machine having an odd number of arms or lugs each supporting one or more replaceable cutting teeth. Earth augers comprise a shaft having a helical flight with an auger head fastened to the lower end of the flight or auger shaft. Attached to such head have been pairs of removable members, generally termed shank plates or tooth holder plates, each plate carrying one or more replaceable teeth. The teeth are designed to absorb the principal wear of the digging action and hence are frequently replaced. If teeth are replaced when necessary, the tooth holding plate is not subjected to excessive wear but frequently such plates must be replaced or repaired because of failure to maintain the teeth in proper condition. Hence, the plates are generally bolted or non-permanently secured to the auger head. Below the auger head is usually secured a pilot bit which first penetrates the soil and functions to maintain the auger in proper direction for drilling.

A principal function of the present invention is to provide a head which supports three or an odd number of arms or lugs each holding one or more cutting teeth. In the following description and accompanying drawing, three lugs each holding one tooth are shown. Two of the teeth at the bottom of the head are disposed to cut the bottom of the hole and are about 140° to 160° apart on one side of the axis of rotation while the third tooth is located on the other side of the axis and is turned edgewise to cut the side of the hole being dug. The third tooth insures clearance for the auger which follows the head. The provision of clearance reduces wear on the outside of the helix, simplifies withdrawing the auger head and helix from the hole and reduces tendency upon such withdrawal to knock loose rocks or dirt into the hole. The side cutting tooth leaves a smooth wall in the hole. It also acts to stabilize or balance the forces acting upon the auger by reason of the torque resistance of the bottom-cutting teeth, thereby overcoming any tendency of the aforementioned forces to cause the auger to deviate from the desired direction of drilling.

A principal feature of the present invention is the fact that the bottom cutting teeth are attached to the tooth holding plate at such an angle that they veer outwardly and downwardly at abrupt angles, which angles are more effective for cutting action than those heretofore used in equipment of this type, but which also produce force components acting upon the auger head which are termed herein "side thrust" and "down thrust." A principal feature of the invention, therefore, is the mounting of the teeth in the tooth holding plates and the tooth holding plates in projecting lugs or arms on the auger head body in such manner as to overcome or compensate for the side and down thrusts. Accordingly, a single bolt may be used to hold the tooth holding plate in position because of the structure whereby the parts are mounted relative to each other.

Accordingly, a principal object of the present invention is to provide structure which reduces the strain to which the bolts or other fastening means holding the tooth holder plate on the auger head are subjected in normal usage of the equipment. One of said stresses, termed "side thrust," tends to move the shank blade either in an inward or outward direction across the auger head. Such force is resisted by providing a tongue in the lug and a corresponding groove in the tooth holder plate. Hence, side thrust which tends to cause a pivotal movement relative to the bolt is resisted by the tongue and groove.

A further stress imposed upon the fastening means holding the tooth holder plate on the auger head lug is a lever action whereby the downward pressure on the tooth resulting from the digging is balanced by tension on the aforesaid bolt, with the edge of the auger head functioning as a fulcrum upon which the plate is balanced. This stress is also resisted by the structure of the present invention by providing a shallow, backward facing channel in the tooth holder plate which receives the forward edge of the auger head lug. Such channel serves as a socket resisting the lever action heretofore mentioned and thus the plate and head themselves absorb the forces which would otherwise be transmitted to the fastening means.

A further feature of the invention is the provision of means which mounts the bottom teeth at different radial distances from the axis of rotation of the auger and at the same or slightly different depths so that the entire area of the hole being dug outside the diameter of the pilot bit is effectively traversed.

The third or side cutting tooth of the present invention may be mounted directly in the lug or arm of the auger head without the use of an intermediate holder plate or a separate plate may be provided. In ordinary usage it is not possible to wear out this particular tooth holder despite excessive wear of the various teeth and hence replacement of the lug or arm of the side cutting tooth is usually unnecessary.

A still further feature of the invention is the optional provision of intercommunicating holes through the auger shaft, auger head and pilot bit for air, water or drilling compound which may be pumped from the surface to the bottom of the hole to facilitate digging action.

Other objects of the present invention will become apparent upon reading the following specification and referring to the accompanying drawings in which similar characters of reference represent corresponding parts in each of the several views.

In the drawings:

FIG. 1 is a side elevational view of an auger head in accordance with the present invention, a pilot bit and a portion of an auger.

FIG. 2 is a bottom plan view of FIG. 1.

Figure 3:
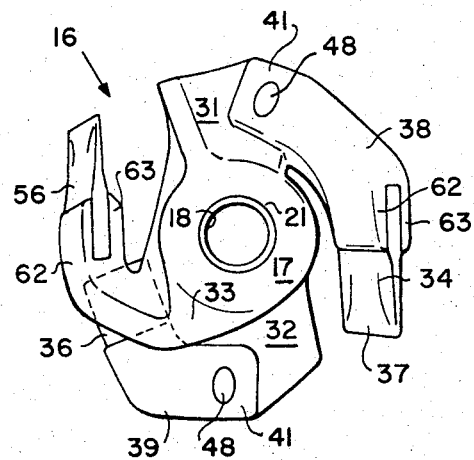
FIG. 3 is a top plan of the auger head.
Figure 5:
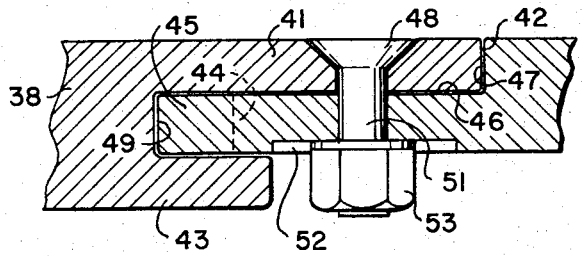
FIG. 5 is a sectional view taken substantially along line 5—5 of FIG. 4.
Figure 4:
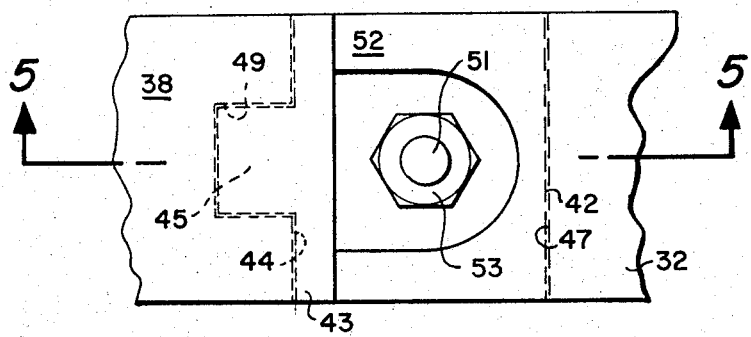
FIG. 4 is an enlarged fragmentary view of the connection of an auger arm and holder plate viewed substantially along line 4—4 of FIG. 1.

As shown in FIG. 1, a conventional auger has an elongated hollow shaft 11 which in accordance with the present invention may be of great length and operate under severe digging conditions, frequently being made up of a plurality of sections threaded together end to end. Around the shaft 11 is a helical flight 12 which functions to convey earth dug to the surface and to maintain the shaft 11 in the center of the hole being dug. The bottom end of the shaft 11 is provided with coupling or connecting means for the parts therebelow and such connecting means may be an internal drill pipe thread, it being understood that many different forms of connecting means may be substituted.

Below flight 12 is the auger head 16 which is the subject of the present invention. It will be noted that in the form of the invention here shown, head 16 is provided with a substantially truncated conical body 17 which may taper slightly downwardly. In the form of the invention here shown, body 17 is provided with a central bore 18 which communicates with the hollow bore 19 in shaft 11, it being understood that the use of the hollow shaft for air, water or drilling compound is optional. The upper end of body 17 is formed with a threaded portion 21 mating with threads in shaft 11 to couple the head to the end of the shaft 11. The bottom of body 17 is formed with an internal, non-circular socket 22. Below head 17 is a pilot bit 23 such as that shown in U.S. Patent 2,639,122 which has an upper projecting non-circular connecting portion 24 fitting in socket 22 with a driving fit and held in place by a transverse bolt 26. Sideward extending apertures 27 may be formed in the pilot bit communicating with the bore 18 for the emission of the fluid pumped down through the hollow shaft 11.

The exterior of body 17 is formed with three protruding arms or lugs 31, 32, 33. Lug 31 originates near the top of body 17, projecting substantially radially outwardly from the body and then slanting downwardly in the direction of rotation of the auger in a helical configuration. Lug 32 originates at a lower elevation than lugs 31 and also protrudes substantially radially outwardly and then descends in a substantially helical configuration but of lesser pitch than the configuration of lug 31. Lug 33 originates at about the same elevation as lug 31 and about 90° angularly rearwardly thereof in the direction of rotation of the shaft and protrudes radially outwardly and then downwardly-outwardly with very little helical pitch as compared with lugs 31 and 32.

Lugs 31 and 32 provide the mounting means for the two lowermost or bottom cutting teeth 34, 36, respectively. The shape of the teeth is subject to variation, those illustrated being similar to those shown in Patent 2,968,880 and have distally tapering top and bottom surfaces terminating in a transverse broad cutting edge 37. Cutting edge 37 of tooth 34 may be slightly lower than the corresponding cutting edge of tooth 36 (see FIG. 1) and tooth 34 is preferably farther from the axis of rotation of the auger than tooth 36, the paths of teeth 34, 36 being complementary and covering the entire area of the hole being dug outside of that covered by the pilot bit 23. It will further be seen particularly with reference to FIG. 1 that cutting edges 37 are not parallel to a plane transverse to the axis of rotation of the auger shaft and their inner corners are lower than the outer corners to facilitate the digging action.

Between tooth 34 and lug 31 is a tooth holding plate 38 and a similar plate 39 is interposed between tooth 36 and lug 32. Although the configuration of these plates differs somewhat in order to accomplish the ultimate positioning of the teeth as has been described and as is illustrated, nevertheless there are certain features in common which are important to the present invention. At the rearward end of plate 38 is a rectangular cross-section upwardly slanted tongue 41 having a blunt transverse end 42. Spaced below but parallel to tongue 41 is a rearward extending lip 43, there being a rearward-upward facing channel 44 between tongue 41 and lip 43. Lug 31 is formed at its front edge with a downwardly-forwardly slanted flat step 46 having a shoulder 47 at its back end. The bottom surface of tongue 41 fits snugly against the top surface of step 46 and the rearward end 42 of tongue 41 fits against the shoulder 47. The head 48 of bolt 51 is recessed into the tongue 41 of holder 38 and also through the tongue 52 below step 46 and is secured by nut 53 on the underside of tongue 52. The stepped forward projection of lug 32 is formed with a central forward-extending tongue 45 and holder 38 with a mating groove 49.

The side thrust on tooth 34 occasioned by the digging action is in a generally radially outwardly direction and this is transmitted directly to holder 38. As the best appears in FIG. 2, the force thus transmitted to plate 38 is in an outward direction. Such force is passed on to lug 31 as a force tending to pivot around the axis of bolt 51 and such force is resisted by end 42 of tongue 41 engaging the shoulder 47 and more importantly by the tongue 45 fitting in groove 49. Accordingly, a single bolt 51 adequately resists the side thrust imposed on the tooth 34.

Another force imposed on the tooth 34 is a downward-inward or tilting force occasioned by the approximately 45° of the tooth with reference to the plane of the bottom of the hole being dug. This force is transmitted directly to the plate 38 and from the plate 38 to the lug 31. The channel 44 engaging the front edge of tongue 52 transmits the strain of this tilting force directly to the lug 31 without imposing an undue stress on bolt 51.

The means of attachment of holder 39 to lug 32 is essentially the same as that of holder 38 to lug 31 and corresponding parts are identified with the same reference numerals.

Lug 33 is not subjected to undue wear despite severe wearing of teeth 34, 36 and tooth 56 supported thereby and hence the use of a tooth holding plate equivalent to members 38 or 39 is usually unnecessary. In other words, tooth 56 may be directly connected to the lug 33. However, it will be seen that the tooth 56 is directed substantially more outwardly than teeth 34 and 36 and its cutting edge 37 is almost tangent to the circle being dug by the tooth. Hence, the tooth 56 cleans out the side of the hole to a slightly larger diameter than body 17 and flight 12 to provide the necessary clearance for digging.

Various means may be used to hold the teeth 34, 36 and 56 in their respective holders, one preferred means being shown in Patent 2,968,880. It will be understood that other means may be used. The forward end of plate 38 (or plate 39 or lug 33) is formed with top and bottom flanges 62, 63 interconnected by a web not shown substantially complementary to a slot in the teeth. A resilient insert of rubber or synthetic rubber holds the tooth in place, as explained in the patent.

In the operation of the auger head hereinafter described, the cutting edge 37 of the lowermost tooth 36 cuts the bottom of the hole, the tooth 36 cutting immediately outside the hole cut by the pilot bit 23 and the tooth 34 cutting immediately outside of the path of the tooth 36. The teeth slant downwardly at about a 45° angle which is very effective for bottom cutting action and are tilted slightly outwardly-upwardly so that their inner corners first penetrate the earth being dug, at least when the teeth are in sharpened condition. The forces transmitted to the teeth 34, 36 are a side thrust outwardly and a tilting downward force, which two forces are transmitted directly to the tooth holding plates 38 and 39. The angle between the tongue 41 of plate 38 and the lug 31 is considerably different from that between the tooth and said lug. Hence, the side thrust component is converted into a couple component about the axis of bolt 51, which turning force is resisted by tongue 45 and groove 49. The tilting component is resisted by the shallow channel between the tongue 41 and lip 43 into which the forward edge of the tongue 52 of lug 31 is received, and thus the single bolt 51 is not unduly stressed. Accordingly, a single bolt holding the plate on the lug resists all of the forces imposed by the digging action of the tooth without exceeding its strength. The same remarks apply to the means holding tooth 36 in place.

What is claimed is:

1. An auger head comprising a body rotatable about an axis, at least three lugs projecting from said body, each said lug having at least one tooth holding means, a detachable tooth held by each said tooth holding means, said tooth having a distal portion with a cutting edge and a proximal portion received by said tooth holding means, retaining means retaining said proximal portion in said tooth holding means, at least two said teeth held by their respective tooth holding means with their cutting edges transverse to said axis, a third said tooth substantially higher than said first-mentioned two teeth and held by its holding means with its cutting edge directed outward to enlarge the side of the hole dug by said first-mentioned two teeth, said third tooth angularly intermediate and opposite said first mentioned two teeth when viewed in plan, said first-mentioned two teeth being in the range of between 140°–160° apart viewed in plan and said third tooth being intermediate said first-mentioned two teeth, said third tooth balancing the torque of said first-mentioned two teeth and stabilizing said head to dig in a straight line.

2. An auger head according to claim 1 in which one of said first-mentioned two teeth is farther from said axis than the other of said first-mentioned two teeth.

3. In combination, an auger having a hollow shaft, an external helical flight on said shaft, an auger head according to claim 1, means conecting said auger head to said shaft, said body hollow, the hollows in said body and shaft intercommunicating, a pilot bit below said auger head, means connecting said pilot bit to said auger head, said pilot bit formed with openings communicating with the hollow in said auger head, whereby fluid forced through said auger shaft flows through said auger head and out through said openings in said pilot bit.

4. An auger head comprising a body rotatable about an axis, at least three lugs projecting from said body, each said lug having at least one tooth holding means, a detachable tooth held by each said tooth holding means, said tooth having a distal portion with a cutting edge and a proximal portion received by said tooth holding means, retaining means retaining said proximal portion in said tooth holding means, at least two said teeth held by their respective tooth holding means with their cutting edges transverse to said axis, a third said tooth higher than said first-mentioned two teeth and held by its holding means with its cutting edge directed outward to enlarge the side of the hole dug by said first-mentioned two teeth, said third tooth angularly intermediate said first-mentioned two teeth when viewed in plan, said tooth holding means for one of said first-mentioned two teeth comprising a tooth holder plate separate from its said lug, said lug being formed with a step in its top front edge to define a first tongue at the front of said lug, said plate being formed at its rear edge with a second tongue overlapping said first tongue and in face-to-face contact therewith and having a groove to receive said first tongue and a bolt through said tongue to hold said tongues together, side thrust against said tooth held by said tooth holding means being absorbed as pivotal movement of said plate about said bolt resisted by said second tongue in said groove.

5. An auger head according to claim 4 which further comprises a lip on the underside of said plate under the front edge of said first tongue, the front edge of said first tongue being received between said second tongue and said lip, whereby down thrust against said tooth is resisted by said tongues and said lip.

6. An auger head according to claim 4 in which said third tooth is directly connected to its respective lug.

7. An auger head according to claim 4 in which a single bolt holds each said plate in engagement with said lug.

8. An auger head according to claim 4 in which the angle of attack of said teeth relative to the plane of the bottom of the hole dug is about 45°.

References Cited
UNITED STATES PATENTS

| | | | |
|---|---|---|---|
| 1,826,087 | 10/1931 | Newman | 175—391 |
| 2,680,597 | 6/1954 | Brown | 175—413 X |
| 2,783,974 | 3/1957 | Veasman | 175—391 X |
| 2,952,085 | 9/1960 | Petersen | 175—413 X |
| 3,057,091 | 10/1962 | Petersen | 175—413 X |
| 3,190,379 | 6/1965 | Troeppl | 175—391 X |
| 3,207,242 | 9/1965 | Miller | 175—394 |
| 3,316,988 | 5/1967 | Petersen | 175—391 |

NILE C. BYERS, JR., *Primary Examiner.*